United States Patent [19]

Kemper

[11] 4,100,815
[45] Jul. 18, 1978

[54] VARIABLE DISPLACEMENT PISTON ENGINE

[75] Inventor: Yves Jean Kemper, Birmingham, Mich.

[73] Assignee: Vadetec Corporation, Troy, Mich.

[21] Appl. No.: 743,600

[22] Filed: Nov. 22, 1976

[51] Int. Cl.² .............................................. F16H 23/60
[52] U.S. Cl. ....................................................... 74/60
[58] Field of Search .............. 74/60; 417/222; 91/504, 91/506

[56] References Cited

U.S. PATENT DOCUMENTS 3,418,941   12/1968   Mowbray ................................ 91/506

Primary Examiner—Benjamin W. Wyche
Assistant Examiner—Wesley S. Ratliff, Jr.
Attorney, Agent, or Firm—Lane, Aitken, Dunner & Ziems

[57] ABSTRACT

A variable stroke piston engine in which power developed by piston reciprocation is transmitted to a cylindrical nutating member journaled on its exterior to a rotatable support connected to a second shaft concentric with the first shaft, the nutating member having an internal surface in frictional engagement with a pair of oppositely convergent cone-like members keyed for rotation with the first shaft. The nutating member is disposed on an axis inclined with respect to the axis of the first shaft at an angle which may be adjusted to vary simultaneously piston stroke distance and rotational speed of the first shaft without changing the rotational speed of the second shaft for a given frequency of piston reciprocation. The first and second shafts are connected respectively to each of two inputs of an epicyclic gear train having an output planet gear carrier connected to an engine output shaft. The geometry of the engine enables operation by which output shaft speed varies inversely with piston stroke length or engine displacement.

18 Claims, 8 Drawing Figures

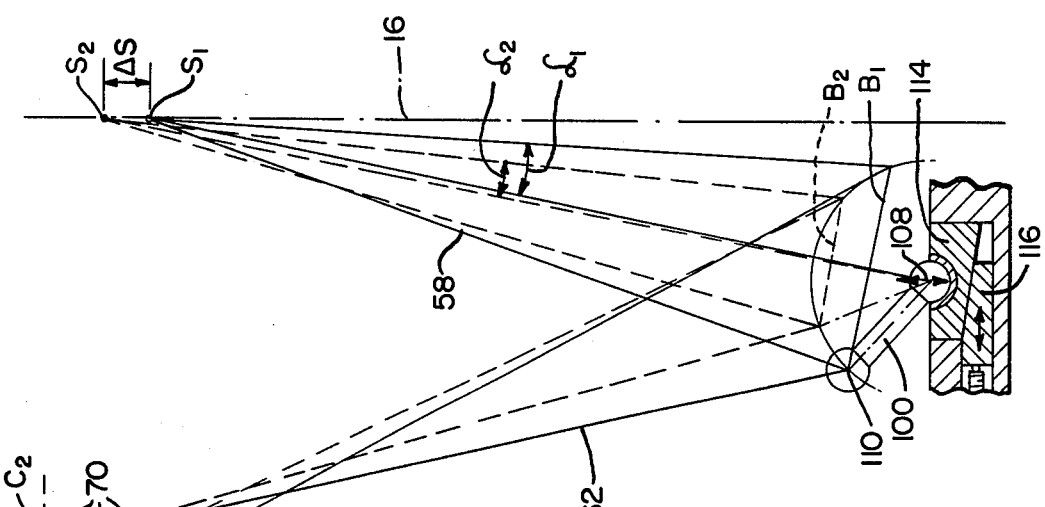
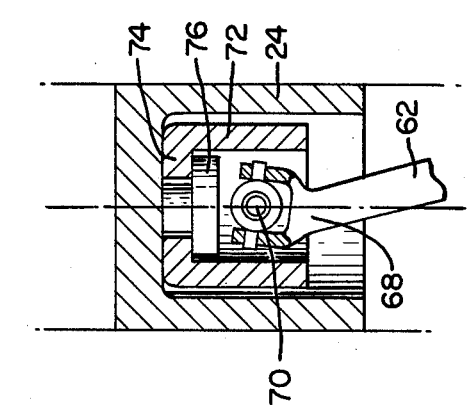
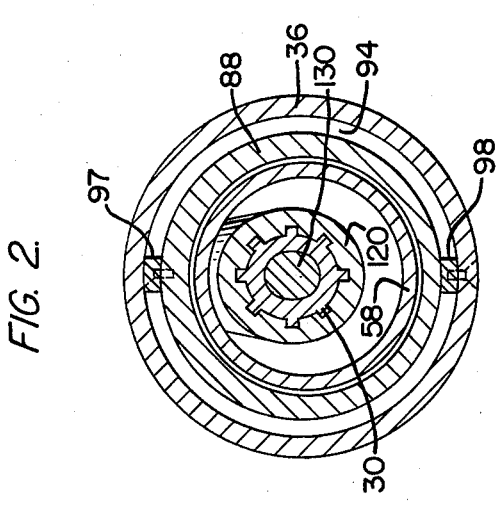
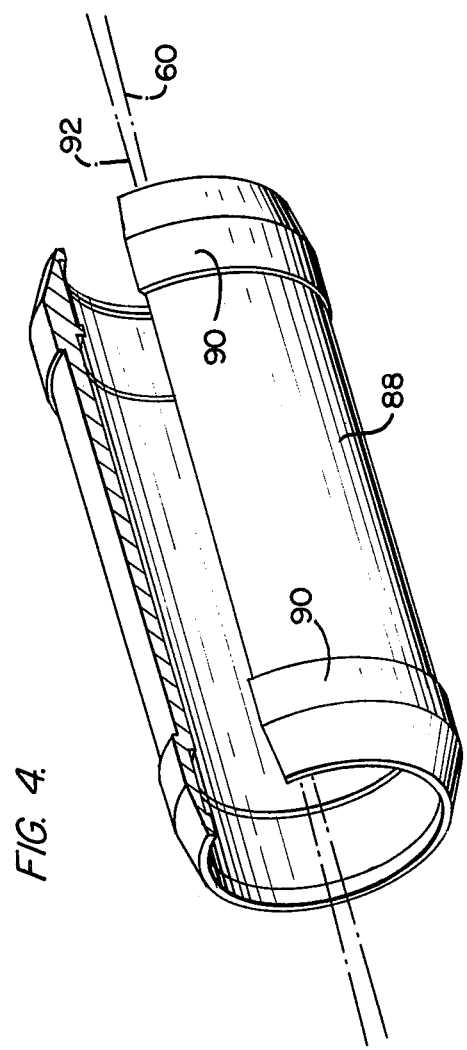

VARIABLE DISPLACEMENT PISTON ENGINE

BACKGROUND OF THE INVENTION

This invention relates to power plants and more particularly, it concerns improvements in variable displacement reciprocating engines, principally internal combustion engines which operate in accordance with the well-known Otto or Diesel cycles, but also including heat engines in which fuel is burned externally, such as steam engines and Stirling engines, for example.

In a co-pending application for U.S. Patent, Ser. No. 738,704, filed Nov. 3, 1976 by the present inventor, there is disclosed an embodiment of an internal combustion engine in which power developed by pistons reciprocating in cylindrical combustion chambers is transmitted to a nutating generally cylindrical member carried by an external rotary support member about an output shaft having a pair of oppositely convergent cone-like members to which torque is transmitted by friction from internal rolling surfaces on the cylindrical nutating member. The thrust of piston reciprocation is absorbed by double-ended swivel links each having one end universally pivotal about a fixed point of reference and the other end universally pivotal in a socket fixed at one end of the nutating cylindrical member. A feature of the illustrative embodiment disclosed is the provision of an eccentric sleeve means by which the angle of cylindrical member nutation may be varied in a manner to vary the length of piston stroke relative to a cylinder head either with or without a constant compression ratio.

In such engines, the frequency of piston reciprocation is directly proportional to the angular velocity of the support journaled to the exterior of the cylindrical nutating member. Output speed or angular velocity of the shaft to which the cone-like members are keyed is a function of the effective internal radius of the nutating cylindrical member and the radii of the cone-like members at the point of frictional engagement between these members. Output speed may be varied for a given engine speed by shifting a pair of ring-like members carried on the interior of the cylindrical nutating member axially of the cone-like members carried on the output shaft.

In an engine of this type, the rotational speed of the output shaft is related to engine speed in accordance with the following equation:

$$\dot{\omega} = \dot{\alpha} - \dot{\alpha} R_1/R_2$$

In the operation, $\dot{\omega}$ represents the rotational or angular velocity of the output shaft; $\dot{\alpha}$ is the rotational velocity of the nutating member support about the axis of the output shaft or the orbital velocity of the nutational axis in a bi-conical path about the output shaft axis; $R_1$ is the radius of the effective internal rolling surface of the nutating member; and $R_2$ is the radius of each cone-like member at the point of frictional engagement with the respective internal rolling surfaces of the nutating member.

From the above formula, it will be appreciated that output velocity ($\dot{\omega}$) will be equal to engine speed ($\dot{\alpha}$) but in a direction of rotation opposite to engine speed when the proportion $R_1/R_2 = 2$. Also, this condition will exist when the angle of intersection between the axis of the nutating member and the output shaft axis is maximum. For a given engine speed ($\dot{\alpha}$), the speed of output shaft rotation will decrease to or approach zero as the ratio $R_1/R_2$ approaches one. Because the internal rolling surfaces carried by the nutating members are provided on axially shiftable ring-like members, the ratio of output speed to input speed may be varied independently of the angle of axes intersection though in a manner requiring excessive axial movement of the nutating member carred rings as a result of varying the angle of nutating member axis intersection with the axis of the cone-like members to alter the length of piston stroke of the engine.

In addition, it is well known that the power developed by piston-type internal combustion engines varies directly with length of piston stroke or displacement and frequency of piston reciprocation or engine speed. In an engine of the type referred to above, therefore, where piston stroke varies directly with variation in the angle of intersection between the axis of the nutating member and the axis of the cone-like members, it would be desirable to achieve an operating condition in which output shaft speed and engine speed are varied in inverse proportion to variation of piston stroke length or engine displacement. Under such conditions, developed power can be controlled to optimize engine efficiency for varying loads connected to the output shaft.

SUMMARY OF THE INVENTION

In accordance with the present invention, the output shaft speed of a variable displacement piston engine is varied in inverse proportion to piston stroke length variation in response to a single adjustable control function determinative of both piston stroke length and the ratio of engine speed to output shaft speed. This operating characteristic is achieved by a structural arrangement in which a pair of cone-like members, rotatably supported on a first axis, are driven by rolling friction engagement with interior rolling surfaces of a nutatable cylindrical member having a second axis inclined with respect to and intersecting the first axis midway between the cone-like members. The nutating member is supported externally by a support member journaled for rotation about the first axis in direct proportion to engine speed or frequency of piston reciprocation as a result of a direct connection of engine pistons to one end of the cylindrical nutating member. Torque developed in the support member is transmitted as one of two inputs to an epicyclic gear train, the other of the two inputs being a direct connection with the cone-like members. These torque inputs are transmitted through the epicyclic gear train to a common engine output shaft.

Variation in piston stroke length as well as speed variation of torque transmission to the cone-like members is effected by adjusting the angle of first and second axes intersection. To this end, a control member in the form of an eccentric sleeve is provided between the exterior of the nutating cylindrical member and the support member. The eccentric sleeve is rotatably adjustable with respect to the support member by a pressurized control fluid system operable to rotate the eccentric sleeve relative to the nutating cylindrical member and the support member against a bias force resulting from transmission of torque from the nutating cylindrical member to the rotatable support member. The cone-like members are designed with a slight meridianal radius so that variation in the angle of first and second axes intersection will shift the point of rolling friction contact between the interior of the nutating cylindrical member and the cone-like members along the axial length of the cone-like members and correspondingly, vary the effective radius of the cone-like members.

In accordance with well known principles of epicyclic gear operation, variation of one of two torque inputs will vary the speed of the output of the gear train.

Accordingly, it is a primary objective of the present invention to optimize the efficiency of piston type engines by varying output speed in inverse proportion to engine displacement variation using a single control function. Other objects of the invention include: the provision of an improved internal combustion engine; the provision of a novel method for internal combustion engine operation; the provision of such an internal combustion engine which is readily adaptable to diverse operating parameters; the provision of such an internal combustion engine in which the transmission of power originating in piston reciprocation is transmitted to a variable speed output shaft by a minimal number of operating parts; and the provision of such an engine in which the components needed for the transmission of power from reciprocating pistons to a rotary output shaft are easily manufactured.

Other objects and further scope of applicability of the present invention will become apparent from the detailed description to follow taken in conjunction with the accompanying drawings in which like parts are designated by like reference numerals.

BRIEF DESCRIPTION OF THE DRAWINGS

FIG. 2 is a cross-section on line 2—2 of FIG. 1;

FIG. 3 is a fragmentary cross-section through one of the pistons of the engine shown in FIG. 1;

FIG. 4 is a cutaway perspective view illustrating an adjusting component incorporated in the engine of FIG. 1;

FIG. 5 is a schematic diagram illustrating geometric parameters of the engine shown in FIG. 1;

DETAILED DESCRIPTION OF THE PREFERRED EMBODIMENTS

Figure 1:
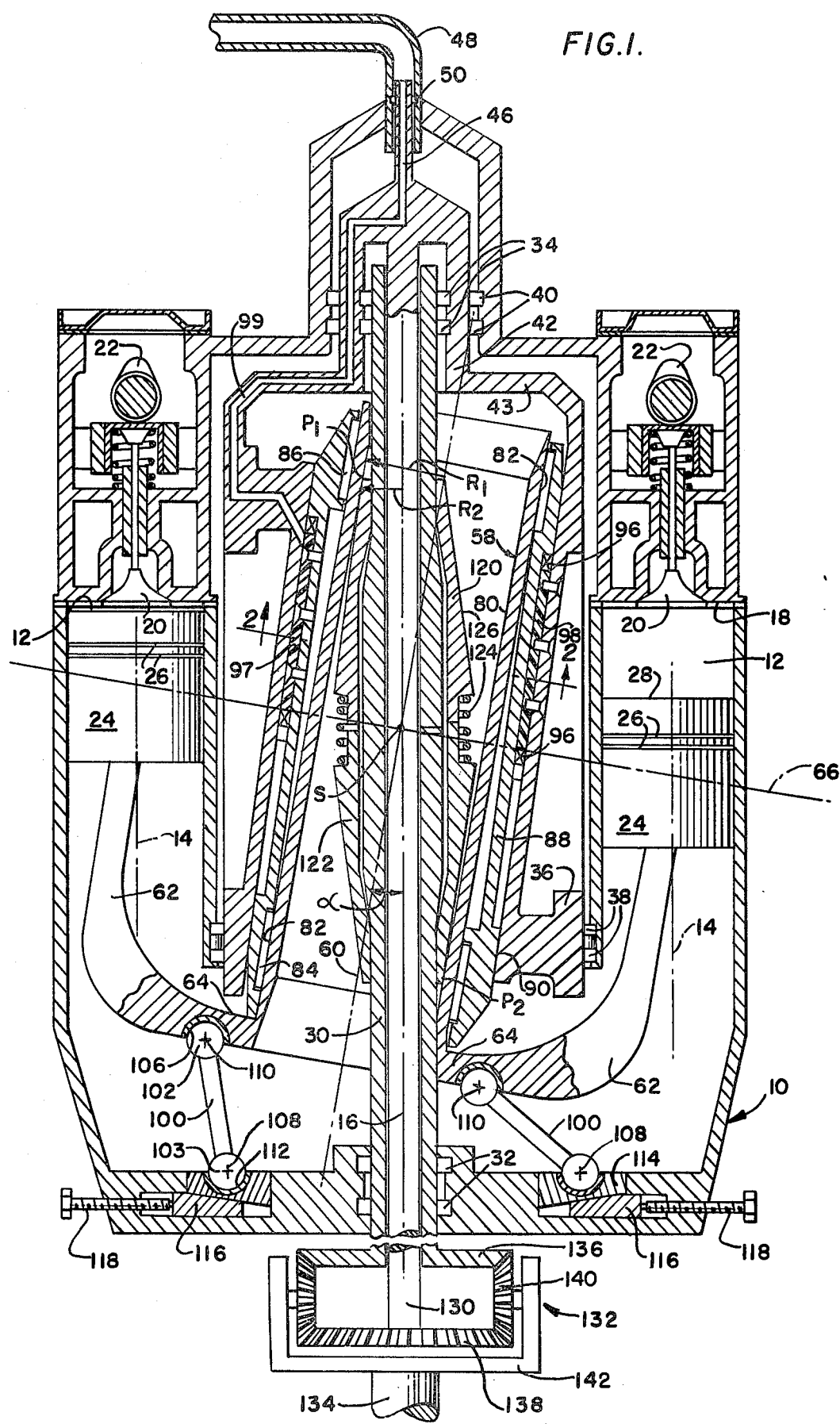
FIG. 1 is a longitudinal cross-section through an internal combustion engine incorporating the present invention.

In FIG. 1 of the drawings, an internal combustion engine is shown to include a frame 10 defining a plurality of cylinders 12 on axes 14 symmetrically disposed in circular fashion about a central engine axis 16. The axes 14 of the cylinders 12 are therefore spaced equidistantly from the axis 16 and in the disclosed embodiment, are parallel to the central axis 16.

Each of the cylinders 12 terminates in an end face 18 in which conventional intake and exhaust valves 20, for example, may be seated and operated between seated or closed and unseated or opened conditions by synchronously rotated cams 22. Positioned in each cylinder 12 for reciprocation therein along the respective axes 14 is a piston 24 having the usual external ring seals 26 to engage the inner surface of the cylinder 12 in fluid tight relation. In conventional fashion, each of the pistons 24 terminates in an end face 28 defining with the cylinder end face 18 an expansible chamber having a volume which will vary in accordance with the reciprocable stroke distance of piston movement along the axis 14.

A torque transmitting member or first shaft 30, in the internal combustion engine illustrated, is supported in the frame 10 by bearings 32 and 34 for rotation on the axis 16. While the bearings 32 and 34 may be of a design different from the illustrated in FIG. 1 of the drawings, for reasons which will be described in more detail below, the bearings 32 and 34 are preferably designed to provide not only for rotation of the shaft 30 about the axis 16, but also for axial movement of the shaft 30 with respect to the frame 10. Thus, in the disclosed embodiment, the bearings are depicted as cylindrical rollers capable of permitting relative axial movement of the respective inner and outer races in which the rollers are contained.

Also supported by the frame 10 for rotation about the axis 16 is an externally journalled support member 36. The support member 36 is journaled in the frame 10 by roller bearings 38 and 40 again of a design to permit relative axial movement of the support 36 and the frame 10. The support member 36 is also rotatable relative to the shaft 30 and is in rotary engagement therewith at a sleeve 42 illustrated as an integral cylindrical extension of an end plate or spider 43. The sleeve 42 is provided with a tubular extension 46 in fluid tight communication with a fixed tube 48 by way of a running telescopic seal 50, the tube 48 being mounted in the end of the frame 10. Thus it will be appreciated that a pressurized control fluid may be introduced or withdrawn through the tube 48 and the tubular extension 46 irrespective of relative rotation and limited axial movement of the extension 46 and the fixed tube 48.

The support member 36 carries a nutatable cylindrical member, generally designated by the reference number 58, and having a longitudinal axis 60 which intersects the axis 16 at a point of intersection S and at an angle α. The nutatable member 58 supports arm-like extensions 62 of generally bellcrank configuration joined integrally at one end 64 with the end of the nutatable member 58, and extending back to a plane 66 which passes through the point S of axes intersection and is perpendicular to the axis 60. The configuration of the arms 62 is such that the projecting ends 68 thereof lying in the plane 66 are located approximately on the axes 14 of the cylinders 12.

As shown in FIG. 3, the projecting end 68 of each arm 62 is pivotally connected to an associated piston 24 by a universal joint 70 having fulcrum point lying in the plane 66. Although the fulcrum point of the universal joint 70 is also located approximately on the axis 14 of the cylinder 12, for reasons which will become apparent from the description following below, the joint 70 will not always be centered on the axis 14 during reciprocation of the pistons 24. Accordingly, the joint connects the extending end 68 of the arm 62 to a sleeve 72 capable of transverse sliding movement with respect to the piston 24 but axially movable therewith as a result of sliding engagement of an end portion 74 under a depending headlike boss member 76 on the piston. In light of the organization shown in FIG. 3, it will be appreciated that movement of the piston 24 along the axis 14 will be accompanied by an equal axial component of movement by the universal joint. The joint 70, however, may also undergo transverse movement independently of the piston 24.

By reference again to FIG. 1, it will be noted that the cylindrical nutating member 58 is formed with concentric surfaces of revolution including a first or inner surface of revolution 80 and a second or outer surface of revolution established by the inner races 82 of axially spaced roller bearings 84 and 86, respectively. The outer cylindrical surface, in conjunction with the bearings 84 and 86, establish a journaled engagement of the cylindrical nutating member 58 by the rotatable support member 36 in the manner to fix the inclination of the axis 60 with respect to the axis 16 and thus establish angle $\alpha$. To facilitate adjustment of the angle $\alpha$, journaled engagement of the nutating cylindrical member with the support member 36 is by way of an eccentric sleeve 88 having an inner cylindrical surface of revolution established by the outer races of the bearings 84 and 86 and outer cylindrical bearing surfaces 90. The relationship of the inner and outer cylindrical surfaces on the eccentric sleeve 88 is illustrated most clearly in FIG. 5 of the drawings. In particular, it will be noted that the cylindrical surface of revolution defined by the outer races of the bearings 84 and 86, or the internal cylindrical surface of the eccentric sleeve 88, is concentric with the axis 60 of the nutating member 58. The cylindrical surface defined by external bearing surfaces 90, however is concentric with an axis 92 inclined with respect to the axis 60 by an angle approximating the maximum variation in the angle of axes intersection or $\Delta\alpha$.

Relative rotation between the eccentric sleeve 88 and the support member 36 will change the value of the angle $\alpha$ to any specific value within a design range. To effect such relative rotation between the eccentric sleeve 88 and the support member 30, an annular fluid chamber 94 is provided between the support member 36 and the eccentric sleeve 88 as shown most clearly in FIGS. 1 and 2 of the drawings. The annular chamber extends axially between fluid seals 96 and is delimited circumferentially by a vane-like sealing bar 97 secured to the exterior of the eccentric sleeve 88 and by a similar vane-like strip or bar 98 secured to the support member 36. The chamber is in fluid communication with the pressurized control fluid introduced or withdrawn from the tube 48 by way of a passageway 99 formed in the support member 36.

As will be seen from the description to follow below, the transmission of torque from the nutating member 58 to the support member 36 through the eccentric sleeve 88 and thus the annular chamber 94, will tend to bias the members 88 and 36 in a direction to reduce the circumferential length of the annular chamber 94. This torque bias may be opposed by fluid pressure to adjust precisely the angular disposition of the eccentric sleeve and the support member 36 and thus adjust the value of the angle $\alpha$.

In light of the organization of parts thus described, it will be appreciated that nutational movement of the member 58, such that the axis 60 travels in a bi-conical path about the axis 16, will impart a rotation in the support member 36 of one revolution for each nutational orbit of the member 58. Also it will be appreciated that because of the connection of the pistons 24 with the nutating member 58 by way of the arms 62, synchronized reciprocation of the pistons under power developed by the expansion of gases in the working chambers 12 will drive the nutating member in the aforementioned bi-conical path with a resulting transmission of driving torque to rotate the support member 36 on the axis 16.

To facilitate such nutating movement of the member 58 by synchronized piston reciprocation and in particular, to absorb the thrust of the pistons 24, swivel means in the form of compression links 100 extend between the frame 10 and the juncture 64 of the arms 62 with the nutating member 58. As shown in FIG. 1, for example, the links 100 are each provided with a spherical ball 102 and 103 at opposite ends engagable for swiveling movement with respect to the frame in sockets 106 at the end of the nutating member 58. In light of this organization of the links 100, it will be appreciated that the ball 103 of each link 100 will swivel on a fixed fulcrum 108 whereas the ball 102, in addition to swiveling in the socket 106, will travel such that the center 110 thereof defines a circle corresponding to the nutational orbiting motion of the axis 60 about the axis 16.

Although the fulcrum 108 of the ball 103 on each of links 100 is characterized above as being fixed relative to the frame 10, it is contemplated that the position of the fixed fulcrum 108 may be adjusted in a direction parallel to the axis 16 to adjust either piston stroke length, locus of piston travel relative to the cylinder head 18 or both of these parameters. Although the effect of such adjustment will be described in more detail below, it will be noted in FIG. 1 that the balls 103 of the links 100 are swiveled in sockets 112 carried by an annular ring 114 having a tapered lower surface 116 supported by wedge-like shims 116. The shims 116 are arranged to be adjusted inwardly or outwardly by suitable means such as set screws 118. While it will be appreciated that the organization of the annular ring 114 and the shims 116 will enable adjustment in the location of the swivel link fulcrum point 108 in a direction parallel to the axis 16, other suitable arrangements may be employed to this end.

The manner in which the structural organization thus shown in FIGS. 1–4 operates to vary the stroke distance of the pistons 24 may be understood by reference to FIG. 5 of the drawings. Although the operation of only one piston 24 is depicted in FIG. 5, it will be appreciated that the same principles apply to all of the pistons employed in the engine, preferrably three or more. In FIG. 5, piston operations for two values of the angle $\alpha$ are designated respectively $\alpha_1$ and $\alpha_2$. Where the angle between the axes 16 and 60 is adjusted to the angle $\alpha_1$, which is the largest of the two angles depicted, nutation of the member 58 will cause the compression link 100 to swivel about the point 108 such that the longitudinal axis thereof between the swivel points 108 and 110 defines a cone having a circular base $B_1$, the vertical axis of such cone intersecting the point of axes intersection $S_1$. As the point 110 travels in a circle defined by the base $B_1$, the universal joint 70, connecting the extending end of the arm 62 with the piston, will cause the piston to travel through a stroke distance designated $D_1$ in FIG. 5. Movement of the top face of the piston 28 will terminate at a point spaced from the end face 18 of the cylinder by distance designated $C_1$ in this figure.

Where the angle between the axes 16 and 60 is reduced to the angle $\alpha_2$ in FIG. 5, the apex angle of the cone defined by the links 100 is decreased with a corresponding reduction in the diameter of the base $B_2$. The circular path defined by the end point 110 of the link 100 will operate to advance the universal joint 70 and the piston 24 through a correspondingly reduced stroke distance $D_2$.

It will also be noted that because the base $B_2$ is advanced toward the point of axes intersection $S_1$ from the circular base $B_1$, the point $S_1$ will shift to the point $S_2$ upon a change of the angle from $\alpha_1$ to $\alpha_2$. This shifting of the point of axes intersection is accomodated in accordance with the present invention by the axially shiftable bearings 32, 34, 38 and 40 supporting the shaft 30 and the support member 36, respectively.

It will be seen also by reference to FIG. 5 that the measure of adjustability of the fixed fulcrum point 108 of each of the links 100 in a direction parallel to the axis 16 will have an effect on the locus of piston stroke reciprocation relative to the cylinder heads 18. The adjustment of the fixed fulcrum point 108, therefore, will enable the precise calibration of the engine geometry to achieve a variable piston stroke while at the same time maintaining a constant compression ratio if such is desired.

In light of the foregoing description, it will be understood that power developed by synchronized reciprocation of the pistons 24 will be transmitted by the nutating member 58 through the second or exterior cylindrical surface thereof and the bearings 84 and 86 to drive the support member 36. Also displacement of the pistons 24 in the cylinders 12 will vary with adjustments in the angle $\alpha$ made by rotating the eccentric sleeve 88 relative to the support 36. Such developed power is thus manifested as torque in the support member 36. In addition, power developed by the engine is transmitted as torque by the nutating member to the shaft 30 as a result of rolling friction engagement of the first or inner cylindrical surface 80 of the nutating member 58 with a pair of oppositely convergent cone-like members 120 and 122 splined or otherwise coupled for rotation with first shaft 30.

Figure 6:
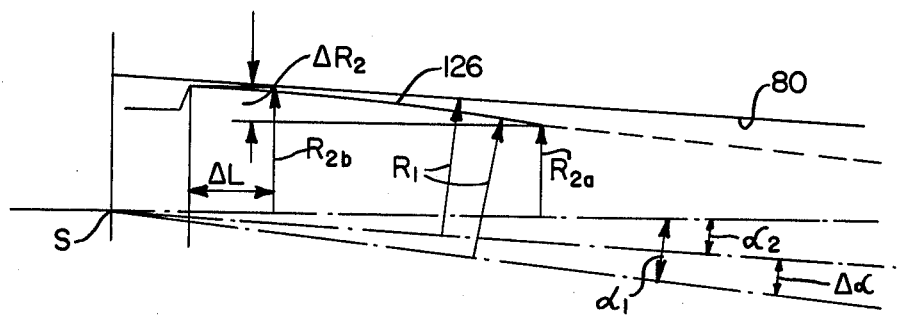
FIG. 6 is a schematic view illustrating dimensional relationship of components incorporated in the engine shown in FIG. 1.
Figure 7:
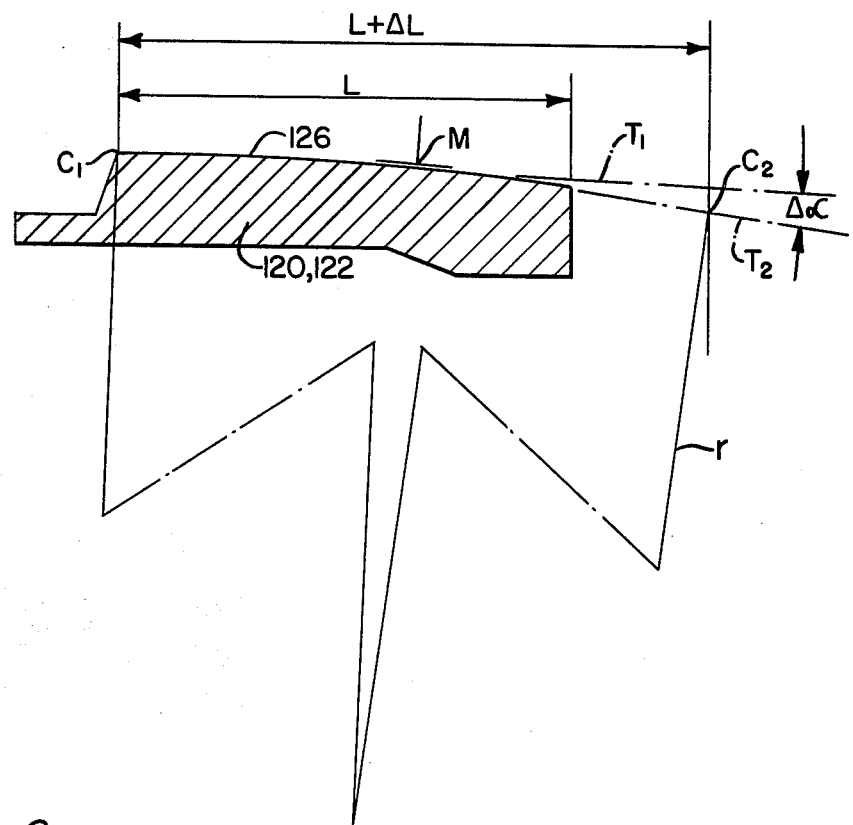
FIG. 7 is a schematic view illustrating graphically the determination of a radius of a component.

As shown in FIGS. 1, 6 and 7, the members 120 and 122 are symmetrically disposed on opposite sides of the point S of axes intersection and are movable axially on the shaft 30 along the axis 16 away from the point S under the bias of a spring 124 or other suitable biasing force into two points of rolling friction engagement $P_1$ and $P_2$ with the first or internal surface 80 of the nutating member 58. Each of the cone-like members 120 and 122 is provided with an external surface of revolution 126 which, as will be described below, is defined by a curved generatrix about the axis 16 to establish an effective variable radius $R_2$ at the points of engagement $P_1$ and $P_2$ by the surfaces 126 with the internal cylindrical surface 80 of the nutating member 58, the latter having a constant radius $R_1$.

The relationships of the radii $R_1$ and $R_2$ with varying values of the angle $\alpha$ may be understood by reference to FIG. 6 of the drawings. As depicted schematically in FIG. 6, a change in the value of the angle $\alpha$ from $\alpha_1$ to $\alpha_2$ through a differential $\Delta\alpha$ will result in a change of the radius $R_2$ which can be accomodated by the cylindrical first or inner surface 80 of the nutating member 58. The radius $R_2$ will change from $R_{2a}$ to $R_{2b}$ or through a differential radius $\Delta R_2$ by sliding movement of each of the cone-like members 120 and 122 on the axis 16 through a distance $\Delta L$. If it is assumed that the angles $\alpha_1$ and $\alpha_2$ represent minimum and maximum values of the angle $\alpha$ to be used in the engine, and correspondingly, the angle $\Delta\alpha$ equal to the maximum variation in the angle $\alpha$, then the axial distance $\Delta L$ will represent the maximum axial movement of the cone-like members 120 and 122 away from the point S.

As shown in FIG. 7, the radius $r$ of the curved generatrix defining the external surface 126 of each of the cone-like members 120 and 122, is determined by the intersection of lines perpendicular to a pair of tangents $T_1$ and $T_2$ intersecting each other at a point M midway between points $c_1$ and $c_2$ of perpendicular intersection by the radius lines with the respective tangents $T_1$ and $T_2$. The distance between the points $c_1$ and $c_2$ is equal to the sum of the axial length of the exterior surface of the cone-like members 120 and 122 and the distance of axial movement $\Delta L$ each of the members 120 and 122 travel with respect to the point of axes intersection S.

As mentioned above, the angular velocity ($\dot\omega$) of the cone-like members and thus of the shaft 30 will be equal to $\dot\alpha$, the speed of nutational movement of the axis 60 about the axis 16, minus the function $\dot\alpha R_1/R_2$. Since the fraction $R_1/R_2$ will always be more than one, it will be seen that rotation of the shaft 30 will be in a direction opposite to that of rotation in the support member 36 and may be made to vary from an angular velocity equal and opposite to that of the support 36 when the function $R_1/R_2$ equals 2, to essentially zero when $R_1/R_2$ approaches unity.

It will be noted by reference to FIG. 1 of the drawings that the first shaft 30 is a hollow or tubular shaft and further that a counter-shaft 130 passes through the tubular shaft 30 for connection directly with the support member 36 at the sleeve 42. The shafts 30 and 130 are rotatable independently of each other and are connected through an epicyclic gear train 132 to an engine output shaft 134. In the preferred embodiment disclosed in FIG. 1, the epicyclic gear train 132 has two torque inputs, one of which being in the form of a bevel gear 136 connected for rotation with the tubular first shaft 30 whereas the other of the two torque inputs is constituted by a bevel gear 138 connected for rotation with the counter-shaft 130. The bevel gears 136 and 138 mesh simultaneously with planets gears 140 rotatably supported by a planet carrier 142 which is connected for rotation with the output shaft 134. Thus, it will be seen that the bevel gear 136 will be driven by the tubular first shaft 30 at a velocity $\omega$ and variable in accordance with the ratio $R_1/R_2$ determined by the angle $\alpha$ whereas the gear 138 will be driven at an angular velocity $\alpha$ which is equal to the rotational velocity of the support member 36. In accordance with known epicyclic gear train operation, the angular velocity $\theta$ of the output shaft 134 is related to $\dot\omega$ and $\dot\alpha$ by the equation:

$$\dot\omega = \frac{\dot\omega N_\omega - \dot\alpha N_\alpha}{2N_p}$$

where $N_\omega$ represents the number of teeth on the gear 136; $N_\alpha$ is equal to the number of teeth on the bevel gear 138; and $N_p$ is the number of teeth on the planet gears 140.

As above mentioned, the shafts 30 and 130 will be rotated in opposite directions and the shaft 30 driven at an angular velocity $\dot\omega$ equal to (but of opposite sign) to $\dot\alpha$ when $R_1/R_2 = 2$. As the fraction $R_1/R_2$ decreases toward one, the velocity $\dot\omega$ will approach zero, whereas the velocity $\dot\alpha$ will remain constant, for a given engine speed. The results achieved by the embodiment illustrated in FIG. 1 may be appreciated by assuming that $N_\omega = N_\alpha = 30$; $2N_p = 30$ and $\dot\alpha = 2000$ rpm. The following relationships will then exist between $R_1/R_2$, $\dot\omega$ and $\dot\theta$:

| $R_1/R_2$ | $\omega$ | $\dot\theta$ |
| --- | --- | --- |
| 2 | −2000 | 0 |
| 1.8 | −1600 | 200 |
| 1.6 | −1200 | 400 |
| 1.4 | −800 | 600 |
| 1.2 | −400 | 800 |
| 1 | 0 | 1000 |

In light of the above assumed operating condition it will be noted as the output speed $\dot\theta$ varies from zero to 1000, the angle $\alpha$ will be varied from its maximum value to its minimum value. Similarly, and as described above with respect to FIG. 5 of the drawings, piston stroke length or engine displacement will vary from a maximum when $\dot\theta$ equals zero to a minimum when $\dot\theta$ equals 1000. It should be noted that the assumed table of relative values is theoretical rather than actual inasmuch as the angle $\alpha$ will never be zero although the angular velocity $\dot\theta$ will in fact be zero when the fraction $R_1/R_2$ reaches an approximate value of 1.05 due to slippage between the surfaces 80 and 126.

Figure 8:
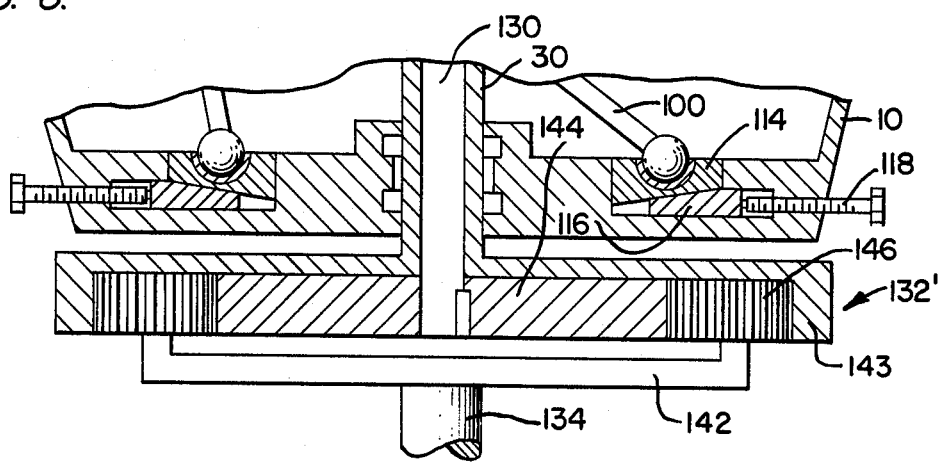
FIG. 8 is a fragmentary cross-section illustrating an alternative embodiment of the invention.

In the alternative embodiment illustrated in FIG. 8, the output shaft 134 is coupled to the shafts 30 and 130 by way of an epicyclic gear train 132' having a ring gear 143 connected to the shaft 30, a sun gear 144 connected to the shaft 130 and planet gears 146 again connected by the planet carrier 142 to the output shaft 134. The equation for this form of epicyclic gearing, using the velocity designations given above is as follows:

$$\dot\theta = \frac{N_r \dot\omega + N_s \dot\alpha}{N_r + N_s}$$

where $N_s$ is the number of teeth on the sun gear 144 and $N_r$ is equal to the number of teeth on the ring gear 142. With this type of epicyclic gear train, the value $\dot\theta$ will vary from a minus value to a plus value through a zero value for variations in the velocity $\dot\omega$ and corresponding values of the fraction $R_1/R_2$ as given above. Thus, in the embodiment of FIG. 8, the output shaft might be used to drive the wheels of an automobile, for example, in "reverse", "neutral", and "forward" at varying transmission speed ratios.

Although numerous specific operating parameters of an engine incorporating the present invention are possible, the combining of torque transmitted by the shafts 30 and 130 through the epicyclic gear train 132 to increase output speed simultaneously with decreasing piston stroke length or engine displacement occurs solely as a result of rotating the eccentric sleeve 88 relative to the support 36 to modify the angle $\alpha$. As a result of the reduction in piston displacement, power developed by the engine will be reduced with increasing output shaft speeds in a manner to optimize engine efficiency under loads commonly incurred in the operation of automobiles, for example. Power developed by the engine will be affected also by frequency of piston recpirocation or engine speed as with output speed. While it is contemplated that engine speed may be controlled in conventional manner by fuel throttling, losses of efficiency resulting from extreme throttling may be substantially avoided.

Thus it will be appreciated that by this invention there is provided a highly improved reciprocating piston engine by which the above mentioned objects are fulfilled. It is contemplated that modifications and/or changes may be made in the disclosed embodiments without departure from the inventive concepts manifested by such embodiments. Accordingly, it is illustrative of preferred embodiments only, not limiting, and that the true spirit and scope of the present invention be determined by reference to the appended claims.

I claim:

1. A piston engine comprising:
   a frame;
   a first shaft supported by said frame for rotation on a first axis;
   a nutatable member having first and second surfaces of revolution mutually concentric with a second axis intersecting said first axis at a point of axes intersection;
   support means rotatable on said first axis and journalled with said second concentric surface of revolution to support said nutating member for movement of said second axis in a biconical path having a central apex coincident with said point of axes intersection;
   a pair of oppositely convergent cone-like members coupled for rotation with said first shaft and spaced equidistantly from said point of axes intersection on said first axis, said cone-like members being in rolling engagement with said first surface of revolution on said nutatable member;
   at least one piston reciprocable in a cylinder defined by said frame and having one end face spaced from said piston;
   means interconnecting said piston and said nutating member to drive said second axis in said biconical path upon piston reciprocation to rotate said support member in one direction of rotation on said first axis and to rotate said first shaft in an opposite direction of rotation at a rotational speed determined by the radii of said cone-like members at points of contact thereon with said first nutating member surface of revolution;
   means to vary the angle of said first and second axes intersection for in phase adjustment of both the distance of piston reciprocation and the rotational speed of said first shaft between minimum and maximum values for a given frequency of piston reciprocation; and
   an epicyclic gear train having torque output means and two torque input means, said first shaft being connected to one of said torque input means and said support member being connected to the other of said two torque input means.

2. The apparatus recited in claim 1 wherein said output means comprises a planet gear carrier.

3. The apparatus recited in claim 2 wherein said two torque input means comprise independently rotatable gears of the same size and including at least one planet gear supported by said planet gear carrier meshing with both said independently rotatable gears.

4. The apparatus recited in claim 2 wherein said epicyclic gear train includes at least one planet gear supported by said planet gear carrier, a sun gear in mesh with said planet gear and a ring gear also in mesh with said planet gear, said support being connected to said sun gear and said first shaft being connected to said ring gear.

5. The apparatus recited in claim 1 including means to bias said cone-like members away from said point of axes intersection into engagement with said first surface of revolution on said nutatable member, said cone-like members having exterior surfaces defined by curved generatrices whereby variation in the angle of axes intersection will cause said cone-like members to move toward and away from each other to vary the radius of said cone-like members at the points of contact thereon with said first surface of revolution.

6. The apparatus recited in claim 1 wherein said means interconnecting said piston and said nutatable member comprises an arm-like extension rigidly connected at one end to said nutatable member and including a sliding pivotal joint connecting the other end of said extension to said piston.

7. The apparatus recited in claim 6 including a swivel link having one end swiveled at a point on said frame and another end swiveled in said nutating member to move in a circular path as said nutatable member is driven orbitally in said bi-conical path.

8. The apparatus recited in claim 7 including means to adjust the point at which said one end is swiveled in a direction parallel to said first axis.

9. The apparatus recited in claim 1 wherein said first surface of revolution on said nutatable member is an internal cylindrical surface of constant radius.

10. The apparatus recited in claim 9 wherein said second surface of revolution is an external bearing surface.

11. The apparatus recited in claim 9 wherein the external surface of said cone-like members in rolling engagement with said nutatable member is developed by a curved generatrix about said first axis.

12. The apparatus recited in claim 11 wherein said curved generatrix is a circular curve having a center located on the opposite side of said first axis from said generatrix.

13. In a piston engine having a first shaft supported by a frame for rotation on a first axis, a nutatable member having first and second concentric surfaces of revolution about a second axis intersecting said first axis at a point of axes intersection, support means rotatable on the first axis and in journalled engagement with the second nutating surface of revolution to establish the angle of axes intersection, a pair of oppositely convergent cone-like members coupled for rotation with the first shaft and spaced equidistantly from the point of axes intersection on the first axis, the cone-like members being in rolling engagement with the first nutating surface of revolution, at least one piston reciprocable in a working chamber defined by a cylinder having one end face spaced from the piston and means interconnecting the piston and the nutating member so that the latter is drivably nutated upon piston reciprocation to move the second axis in a biconical path about the first axis thereby to drivably rotate the support member in one direction of rotation on the first axis and to drivably rotate the first shaft in an opposite direction of rotation at a rotational speed determined by the radii of the cone-like members at points of contact thereon with the first nutating surface of revolution, the improvement comprising:

means to vary the angle of the first and second axes intersection for in phase adjustment of both the distance of piston reciprocation and the rotational speed of the first shaft between minimum and maximum values for a given frequency of piston reciprocation; and means combining the torque of the first shaft and the torque of the support member to provide an engine output torque.

14. The apparatus recited in claim 13 wherein said torque combining means comprises an epicyclic gear train.

15. The apparatus recited in claim 14 wherein said gear train includes a pair of torque inputs connected one to the first shaft and the other to the support member.

16. The apparatus recited in claim 13 including means to vary said output torque speed in inverse proportion to stroke length of piston reciprocation.

17. The method of operating a piston engine having a first shaft supported by a frame for rotation on a first axis, a nutatable member having first and second concentric surfaces of revolution about a second axis intersecting the first axis at a point of axes intersection, support means rotatable on the first axis and in journalled engagement with the second nutating member surface of revolution to establish the angle of axes intersection, a pair of oppositely convergent cone-like members coupled for rotation with the first shaft and spaced equidistantly from the point of axes intersection on the first axis, the cone-like members being in rolling engagement with the first nutating member surface of revolution, at least one piston reciprocable in a working chamber defined by a cylinder having one end face spaced from the piston and means interconnecting the piston and the nutating member so that the latter is drivably nutated upon piston reciprocation to move the second axis in a biconical path about the first axis thereby to drivably rotate the support member in one direction of rotation on the first axis and to drivably rotate the first shaft in an opposite direction of rotation at a rotational speed determined by the radii of the cone-like members at points of contact thereon with the first nutating member surface of revolution, said method of operation comprising the steps of:

varying the velocity of the first shaft in inverse proportion to the length of piston reciprocation; and combining the torque of the first shaft with the torque of the support member to provide an engine output torque.

18. The method recited in claim 17 wherein the engine output torque speed is the alegbraic sum of the torque speeds of the first shaft and the support member.

* * * * *